United States Patent
Han et al.

(10) Patent No.: US 9,992,786 B2
(45) Date of Patent: Jun. 5, 2018

(54) FACILITATION OF MULTIPATH SCHEDULING

(71) Applicant: AT&T Intellectual Property I, L.P., Atlanta, GA (US)

(72) Inventors: Bo Han, Bridgewater, NJ (US); Lusheng Ji, Randolph, NJ (US); Vijay Gopalakrishnan, Edison, NJ (US); Feng Qian, Bloomington, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 93 days.

(21) Appl. No.: 15/086,613

(22) Filed: Mar. 31, 2016

(65) Prior Publication Data

US 2017/0290036 A1 Oct. 5, 2017

(51) Int. Cl.
*H04W 72/12* (2009.01)
*H04L 12/26* (2006.01)
*H04W 88/06* (2009.01)

(52) U.S. Cl.
CPC ..... *H04W 72/1215* (2013.01); *H04L 43/0858* (2013.01); *H04L 43/0882* (2013.01); *H04W 88/06* (2013.01)

(58) Field of Classification Search
CPC .............. H04W 72/1215; H04W 88/06; H04L 43/0858; H04L 43/0882
USPC ........................................................ 370/235
See application file for complete search history.

(56) References Cited

U.S. PATENT DOCUMENTS

| 8,964,757 | B2 | 2/2015 | Watson et al. | |
|---|---|---|---|---|
| 9,491,098 | B1 | 11/2016 | Wilson et al. | |
| 2005/0086363 | A1* | 4/2005 | Ji | H04L 45/00 709/235 |
| 2005/0213503 | A1* | 9/2005 | Guo | H04L 47/15 370/230 |
| 2007/0002874 | A1 | 1/2007 | Kang et al. | |
| 2011/0296006 | A1 | 12/2011 | Krishnaswamy et al. | |
| 2013/0077501 | A1 | 3/2013 | Krishnaswamy et al. | |

(Continued)

FOREIGN PATENT DOCUMENTS

| CN | 103346963 A | 10/2013 |
|---|---|---|
| WO | 2015030641 A1 | 3/2015 |

OTHER PUBLICATIONS

Nika, et al., "Energy and Performance of Smartphone Radio Bundling in Outdoor Environments", Proceedings of the 24th International Conference on World Wide Web, May 2015, ACM, 11 pages.

(Continued)

*Primary Examiner* — Stephen J Clawson
(74) *Attorney, Agent, or Firm* — Amin, Turocy & Watson, LLP

(57) ABSTRACT

Leveraging multiple network interfaces, such as Wi-Fi and cellular, on mobile devices can improve user experience for various applications. Deadline-aware MPTCP scheduling can complement existing MPTCP scheduler. The deadline-aware MPTCP scheduler can dynamically select transmission paths to minimize cellular usage while satisfying data transfer deadlines. The deadline-aware MPTCP scheduler can also address several challenges, such as determining the appropriate traffic pattern over cellular paths, designing proper APIs between MPTCP and applications, and making the scheduler functionality robust and lightweight.

20 Claims, 10 Drawing Sheets

(56) References Cited

U.S. PATENT DOCUMENTS

| | | | |
|---|---|---|---|
| 2013/0095806 A1 | 4/2013 | Salkintzis et al. | |
| 2013/0279331 A1 | 10/2013 | Pluntke et al. | |
| 2014/0355446 A1* | 12/2014 | Altman | H04W 28/0289 |
| | | | 370/235 |
| 2014/0362765 A1 | 12/2014 | Biswas et al. | |
| 2015/0092573 A1* | 4/2015 | Zhang | H04W 24/10 |
| | | | 370/252 |
| 2015/0215225 A1 | 7/2015 | Mildh et al. | |
| 2015/0215345 A1 | 7/2015 | Agarwal | |
| 2015/0215839 A1* | 7/2015 | Johansson | H04W 36/30 |
| | | | 455/426.1 |
| 2015/0215922 A1 | 7/2015 | Bahk et al. | |
| 2015/0237525 A1 | 8/2015 | Mildh et al. | |
| 2015/0245409 A1 | 8/2015 | Medapalli | |
| 2015/0271725 A1 | 9/2015 | Lee et al. | |
| 2015/0281367 A1 | 10/2015 | Nygren et al. | |
| 2015/0282219 A1 | 10/2015 | Kweon et al. | |
| 2015/0295782 A1 | 10/2015 | Ramamoorthy et al. | |
| 2015/0312383 A1 | 10/2015 | Roeland et al. | |
| 2015/0381455 A1* | 12/2015 | Martinsen | H04L 65/608 |
| | | | 370/252 |
| 2016/0007295 A1 | 1/2016 | Kahn | |
| 2017/0163775 A1 | 6/2017 | Ravi et al. | |
| 2017/0171098 A1* | 6/2017 | Le | H04L 47/627 |
| 2017/0188407 A1* | 6/2017 | Zee | H04W 76/026 |
| 2017/0208104 A1* | 7/2017 | Wei | H04L 65/1069 |
| 2017/0223601 A1 | 8/2017 | Egner et al. | |
| 2017/0230200 A1 | 8/2017 | Hariharan | |

OTHER PUBLICATIONS

Han, et al., "An Anatomy of Mobile Web Performance Over Multipath TCP", 2015, ACM, 7 pages.

Raiciu, et al., "How Hard Can It Be? Designing and Implementing a Deployable Multipath TCP", Proceedings of the 9th USENIX Conference on Networked Systems Design and Implementation, 2012, USENIX Association, 14 pages.

Paasch, et al., "Experimental Evaluation of Multipath TCP Schedulers", Proceedings of the 2014 ACM SIGCOMM Workshop on Capacity Sharing, 2014, ACM, 6 pages.

Yang, et al., "Out-of-Order Transmission for In-Order Arrival Scheduling for Multipath TCP", Advanced Information Networking and Applications Workshops (WAINA), 2014, IEEE, 4 pages.

Dreibholz, et al. "Transmission Scheduling Optimizations for Concurrent Multipath Transfer", Proceedings of the 8th International Workshop on Protocols for Future, Large-Scale and Diverse Network Transports (PFLDNeT), 2010, vol. 8, 7 pages.

Office Action dated Apr. 4, 2018 for U.S. Appl. No. 15/099,207, 69 pages.

* cited by examiner

Algorithm 1 Deadline-Aware Scheduling Algorithm

1: Input: $S$ – file size and $D$ – deadline;
2: $sentBytes = 0$;
3: $cellularEnabled = TRUE$;
4: $timeStart = gettimeofday()$;
5: while ($sentBytes < S$) do
6:    if $S - sentBytes > packetSize$ then
7:       $n = packetSize$;
8:    else
9:       $n = S - sentBytes$;
10:    end if
11:    Get $n$ bytes from the file and send them using MPTCP;
12:    $sentBytes\mathrel{+}= n$;
13:    $timeNow = gettimeofday()$;
14:    $timeSpent = timeNow - timeStart$;
15:    Get the estimated WiFi throughput $R_{WiFi}$;
16:    if $(\alpha \times D - timeSpent) \times R_{WiFi} > \beta \times (S - sentBytes)$ && $cellularEnabled == TRUE$ then
17:       Disable the cellular link (e.g., through $setsockopt$);
18:    end if
19:    if $(\alpha \times D - timeSpent) \times R_{WiFi} < \gamma \times (S - sentBytes)$ && $cellularEnabled == FALSE$ then
20:       Enable the cellular link (e.g., through $setsockopt$);
21:    end if
22: end while

FIG. 5

FACILITATION OF MULTIPATH SCHEDULING

TECHNICAL FIELD

This disclosure relates generally to facilitating mobile device network efficiencies. More specifically, this disclosure relates to generating efficiencies by leveraging interplay between wireless fidelity (Wi-Fi) and cellular networks.

BACKGROUND

Multipath transmission control protocol (MPTCP) connections can allow for usage of multiple paths to maximize resource usage and increase redundancy. The redundancy offered by MPTCP can enable inverse multiplexing of resources, and thus increase transmission control protocol (TCP) throughput close to the sum of all available link-level channels instead of using a single channel as required by plain TCP. MPTCP is backwards compatible with plain TCP.

MPTCP is particularly useful in the context of wireless networks—using both Wi-Fi and a mobile network is a typical use case. In addition to the gains in throughput from inverse multiplexing, links may be added or dropped as a user moves in or out of coverage without disrupting the end-to-end TCP connection. The problem of link-handover can be solved by abstraction in the transport layer, without any special mechanisms at the network or link level. Handover functionality can then be implemented at the endpoints without requiring special functionality in the subnetworks—in accordance with the Internet's end-to-end principle. MPTCP can also bring performance benefits in datacenter environments. In contrast to Ethernet channel bonding using 802.3ad link aggregation, MPTCP can balance a single TCP connection across multiple interfaces.

The above-described background relating to a MPTCP is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates an example deadline-aware code according to one or more embodiments.

DETAILED DESCRIPTION

Figure 1:
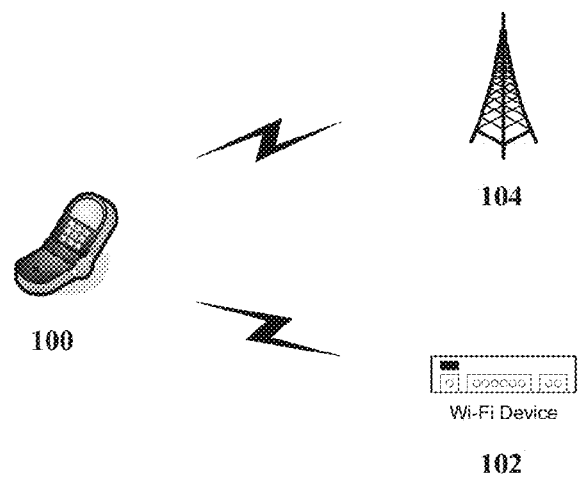
FIG. 1 illustrates an example wireless network comprising a mobile device, a Wi-Fi device, and a cellular network, wherein the mobile device is communicating with the Wi-Fi device and the cellular network simultaneously according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments presented herein to facilitate MPTCP scheduling for mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate MPTCP scheduling. Facilitating MPTCP scheduling can be implemented in connection with any type of device with a connection to the communications network such as: a mobile handset, a computer, a handheld device, or the like.

MPTCP can allow applications to transparently use multiple paths without changing the existing socket programming interface. MPTCP has also been implemented in the Linux kernel. Another feature of MPTCP is that its path selection (i.e., scheduling) can be computed in real-time. This helps MPTCP achieve better performance than other alternatives such as determining data transfer schedules before data transfer. MPTCP can also reach at least 1 gigabit per second (Gbps) of throughput on off-the-shelf smartphones over commodity Wi-Fi and cellular networks.

In spite of its popularity, MPTCP can still face complex trade-off challenges, which are not well balanced, related to multiple dimensions of performance, energy, monetary cost etc. There exist a set of common usage scenarios where as long as data transfer can finish before a certain deadline, a user experience will not be impacted. For example, during video streaming, a smooth playback can be realized if video chunks are fetched before their playback deadlines. For turn-by-turn navigation, a map tile only needs to be fetched before the vehicle is geographically close to the tile's location. Music apps using automated recommendation (e.g., Pandora Music), players do not need the next song until the playback of the current song is close to its end. Furthermore, when users draft emails with large attachments, the users will be satisfied if the attachments can be fully uploaded before they finish writing the emails, supposing the email software can predict a completion time using some machine learning techniques.

For the aforementioned applications above, although blindly using off-the-shelf MPTCP can boost user experience, doing so often incurs unnecessary high-energy consumption and monetary cost due to the indiscriminate usage of cellular paths. Note that the energy consumption of LTE is known to be 7× to 9× higher than that of Wi-Fi, and customers are billed by their cellular data usage. Thus, a more efficient MPTCP can enhance a user experience by minimizing the usage of particular path(s) such as cellular. To address this problem, the present disclosure proposes deadline-aware scheduling that can compliment existing MPTCP schedulers. The proposed deadline-aware scheduler can select paths to minimize the cellular usage while satisfying user-specified data transfer deadlines.

The basic function of a scheduler is to split traffic among multiple paths. An MPTCP scheduler should consider two major constraints: head-of-line blocking and receive-window limitations. When running over links with different characteristics, to ensure in-order delivery of TCP, packets on the fast subflows have to wait for those on the slow subflows in the receiver's out-of-order buffer, which causes head-of-line blocking and burstiness in application data. Due to similar reasons, to fully utilize each subflow's capacity, a receiver needs to maintain a large buffer for out-of-order data delivery. Currently, there are two schedulers in the MPTCP Linux kernel implementation: a round-robin scheduler and a default scheduler that prefers the path with the lowest RTT.

Compared with the existing MPTCP schedulers, a deadline-aware scheduler can satisfy various requirements from users. For example, a deadline-aware scheduler can achieve a maximum aggregated bandwidth of underlying links for the best video-watching experience. A deadline-aware scheduler can finish the data transfer of the file downloading applications as early as possible, limit per-byte energy consumption when the battery is low, or cap the cellular data usage based on a fulfillment quota. It should be noted that fulfillment of the quota can comprise ramping up the transmitting until it reaches the quota and/or transmitting at the quota.

Mobile users can also have various preferences regarding how to use their networks with distinct characteristics. For instance, a user may prefer to use the free Wi-Fi networks over 3G/4G networks for online music streaming from Pandora when at home. However, when the user is traveling and wants to stream videos from YouTube, the user may prefer to use cellular networks for seamless viewing experience, instead of using intermittent Wi-Fi connections. Therefore, preferences can be driven by tradeoffs amongst throughput, latency, energy consumption, monetary cost etc., which may all affect the scheduling decision on how to split traffic over different network paths.

A deadline-aware MPTCP scheduler for video streaming applications can throttle the bandwidth of cellular links and make the aggregated throughput higher than the target value (i.e., the nominal video encoding bitrate). For example, assuming the target throughput is T Mbps and the Wi-Fi throughput is W Mbps, traffic shaping can be applied to the cellular link and its throughput can be limited to T−W Mbps. Although this solution can save cellular data usage, this solution is not cellular network friendly because it keeps the radio interface active during the entire data transfer. A deadline-aware MPTCP scheduler can drive both the cellular and Wi-Fi subflows to their full capacity at the beginning and turn off the cellular subflow when the remaining data can be transmitted over Wi-Fi alone. It can also monitor the progress of data transfer and turns cellular subflow back on if necessary (i.e., when the Wi-Fi path underperforms below estimation to the point that the deadline would be missed if only Wi-Fi continued to be utilized).

In a Dynamic Adaptive Streaming over HTTP (DASH) system, a video can be split into multiple chunks of the same playtime and each video chunk can be encoded with multiple discrete bitrate levels. A manifest file that declares each chunk's parameters can be fetched at the beginning of playing a video so that each individual chunk can be downloaded at the player's discretion. A video player can switch between different bitrate streams at a chunk boundary because the chunks are time-aligned. DASH has become the dominant video streaming solution, due to the use of HTTP that enables the bypass of middleboxes including firewalls, the support of commodity content delivery network (CDN) servers, and the use of stateless web servers.

For a DASH video, it is feasible to get the deadline information for each video chunk from a player. However, chunk size is not a mandatory field of the manifest file. Thus, the amount of data to be transferred may be unknown before downloading a chunk. In practice, chunk size can be found in a "Content-Length" field of the HTTP GET response header, which can allow chunk sizes to be obtained for the deadline-aware scheduler. Since the chunk duration is usually shorter than a cellular tail time, disabling the cellular path will not trigger state changes of cellular radio.

To extend the Linux socket interface and enhance the MPTCP Linux kernel implementation to perform the deadline-aware scheduling can comprise two steps. First, a setsockopt option can be offered to convey the scheduling decision from a user space to the Linux kernel. Second, a component in the existing MPTCP scheduler of selecting the available subflow can be modified for packet transfer. In the function, get_subflow_from_selectors, the cellular subflow can be ignored when the scheduler decides to not use the cellular link. This implementation can work with both the default MPTCP scheduler and the round-robin scheduler.

An alternative approach can be to utilize an existing MPTCP APIs such as mptcp_add_sock and mptcp_del_sock to add/remove the sub-socket over the cellular interface. However, doing so has two drawbacks. When re-establishing the subflow over the cellular path, the MPTCP needs to perform the three-way handshake again, which introduces additional latency and wastes cellular resources. Also, after re-establishing the cellular subflow, its TCP congestion control has to go through the slow start phase, which can limit the utilization of the cellular link. For the DASH video, the scheduling decision can be made by the client, which runs the player and has the knowledge of chunk sizes and deadlines. However, the scheduling can be enforced by the server that is responsible to split the video traffic over the Wi-Fi and cellular subflows. To address this issue, a system to convey the scheduling decision from the client to the server can be implemented by adding a flag in the MPTCP option using a reserved bit.

It should also be noted that an artificial intelligence (AI) component can facilitate automating one or more features in accordance with the disclosed aspects. A memory and a processor as well as other components can include functionality with regard to the figures. The disclosed aspects in connection with deadline-aware scheduler can employ various AI-based schemes for carrying out various aspects thereof. For example, a process for detecting one or more trigger events, modifying a schedule of the one or more trigger events, and changing one or more actions, and so forth, can be facilitated with an example automatic classifier system and process. In another example, a process for penalizing one subflow while preferring another subflow can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed. In the case of communication systems, for example, attributes can be a cellular subflow and a Wi-Fi subflow and the classes can be a scheduling change value. In another example, the attributes can be a frequency band, a technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches including, for example, naïve Bayes. Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to a subflow schedule, modifying a transmit power, modifying one or more reported mobility measurements, and so forth. The criteria can include, but is not limited to, predefined values, frequency attenuation tables, bandwidth, service provider preferences and/or policies, and so on.

In one embodiment, described herein is a method comprising determining a first capacity associated with a Wi-Fi throughput of a Wi-Fi connection to a network device of a network, and determining a second capacity associated with a cellular throughput of a cellular connection to the network device. Thereafter, a first amount of packet data can be transmitted to fill the first capacity of the Wi-Fi throughput and a second amount of packet data can be transmitted to fill the second capacity of the cellular throughput. The transmitting of the second amount of the packet data to fill the second capacity can be terminated in response to a condition associated with the Wi-Fi throughput being determined to have been satisfied, and up to a third amount of the packet data can be transmitted in response to the terminating, wherein the third amount is a remaining amount of the packet data after the first amount and the second amount are sent.

According to another embodiment, a system can facilitate determining a throughput, resulting in throughput data, associated with a transmission of packet data and determining a Wi-Fi capacity, resulting in Wi-Fi capacity data, associated with the transmission of the packet data via a Wi-Fi connection. In response to the determining of the throughput data and the determining of the Wi-Fi capacity data, the system can determine a cellular capacity associated with the transmission of the packet data via a cellular connection, resulting in cellular capacity data. The system can also transmit first packet data via the Wi-Fi connection, of the packet data, to fulfill the Wi-Fi capacity and transmit second packet data via the cellular connection, of the packet data, to fulfill the cellular capacity. Consequently, in response to a condition associated with the transmitting of the second packet data being determined to have been satisfied, they system can terminate the transmitting of the second packet data.

According to yet another embodiment, described herein is a machine-readable storage medium that can perform the operations comprising determining a target transmission value based on a packet time value and a packet size value, resulting in target data associated with a packet transmission. The machine-readable storage medium can also perform operations comprising determining a cellular capacity of a cellular connection based on a Wi-Fi capacity and the target data, wherein the Wi-Fi capacity is associated with a Wi-Fi connection, and wherein the target cellular capacity can be less than an actual cellular capacity. Thereafter, first packet data can be transmitted, via the Wi-Fi connection, to satisfy the Wi-Fi capacity, and second packet data can be transmitted, via the cellular connection, to satisfy the cellular capacity. In response to a condition associated with the packet time value being determined to have been satisfied, the transmitting of the second packet data can be terminated, and in response to terminating the transmitting of the second packet data, third packet data can be transmitted via the Wi-Fi connection.

These and other embodiments or implementations are described in more detail below with reference to the drawings.

Referring now to FIG. 1, illustrated is an example wireless network comprising a mobile device, a Wi-Fi device, and a cellular network, wherein the mobile device is communicating with the Wi-Fi device and the cellular network simultaneously according to one or more embodiments. At time T1, the mobile device 100 can communicate with the Wi-Fi device 102 and the cellular network device 104 simultaneously. For instance, if a user of the mobile device 100 has initiated a request to stream a video, the initial request can be sent via a Wi-Fi connection related to the Wi-Fi device 102 and a cellular connection related to the cellular network device 104. The deadline-aware MPTCP scheduler can drive both the cellular and Wi-Fi connections, of the Wi-Fi device 102 and the cellular network device 104, respectively, to their full capacity.

Figure 2:
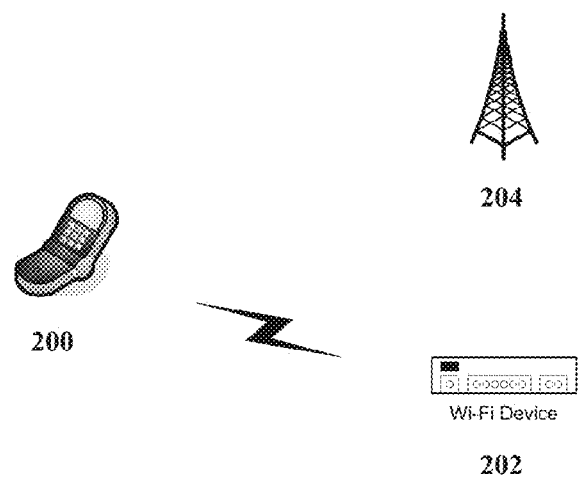
FIG. 2 illustrates an example wireless network comprising a mobile device, a Wi-Fi device, and a cellular network, wherein the mobile device has terminated communication with the cellular network and is only communicating with the Wi-Fi device according to one or more embodiments.

Referring now to FIG. 2, illustrated is an example wireless network comprising a mobile device, a Wi-Fi device, and a cellular network, wherein the mobile device has terminated communication with the cellular network and is only communicating with the Wi-Fi device according to one or more embodiments. At time T2, when it is determined that the remaining data can be transmitted via the Wi-Fi connection, the system can turn off the cellular subflow. Alternatively, once the mobile device 200 has driven the Wi-Fi device 202 subflow and cellular network device 204 subflow to their full capacities, the mobile device 200 can terminate communication with the cellular network device 204 to avoid additional data charges. Terminating the communication between the mobile device 200 and the cellular network device 204 can also be predicated upon an indication that the Wi-Fi device 202 subflow can remain efficient enough to stream the video content without causing any noticeable degradation in service to the user. It should be noted that the same paradigm can be applied to leveraging the cellular subflow as the primary subflow and the Wi-Fi subflow as the secondary subflow depending upon user preferences and/or specific scenarios affecting cost or quality of service.

Figure 3:
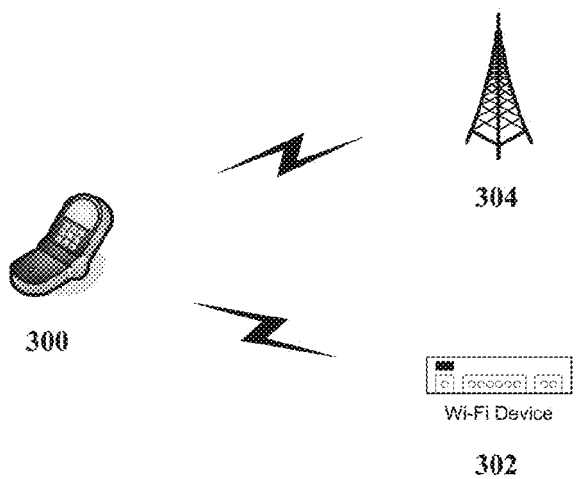
FIG. 3 illustrates an example wireless network comprising a mobile device, a Wi-Fi device, and a cellular network, wherein the mobile device has reinstated communication with the cellular network and is communicating with the Wi-Fi device and the cellular network according to one or more embodiments.

Referring now to FIG. 3, illustrated is an example wireless network comprising a mobile device, a Wi-Fi device, and a cellular network, wherein the mobile device has reinstated communication with the cellular network and is communicating with the Wi-Fi device and the cellular network according to one or more embodiments. At time T3, the mobile device 300 can reinitiate communication with the cellular network device 304 in response to a condition associated with the Wi-Fi device 302. The condition associated with the Wi-Fi device 302 can comprise an indication that the Wi-Fi device 302 and/or its associated subflow has encountered a degradation in efficiency/quality, has underperformed, and/or will miss a deadline associated with the data transfer. For instance, the system can continually monitor the progress of the data transfer of the Wi-Fi device 302. Consequently, if there is an indication that the Wi-Fi device 302 subflow is underperforming, and/or a data transfer deadline could potentially be missed if only Wi-Fi device 302 subflow were to be used, then the system can reinstate communication over the cellular network device 304 subflow, resulting in simultaneous communication with the Wi-Fi device 302 subflow and the cellular network device 304 subflow. It should be noted that underperformance of a subflow can be based on a preset value, an estimated value, or an AI based determined value of the deadline. It should also be noted that the cellular network device 304 communication can also be terminated again in response to an indication that the Wi-Fi device 302 subflow can efficiently transmit any remaining data.

Figure 4:
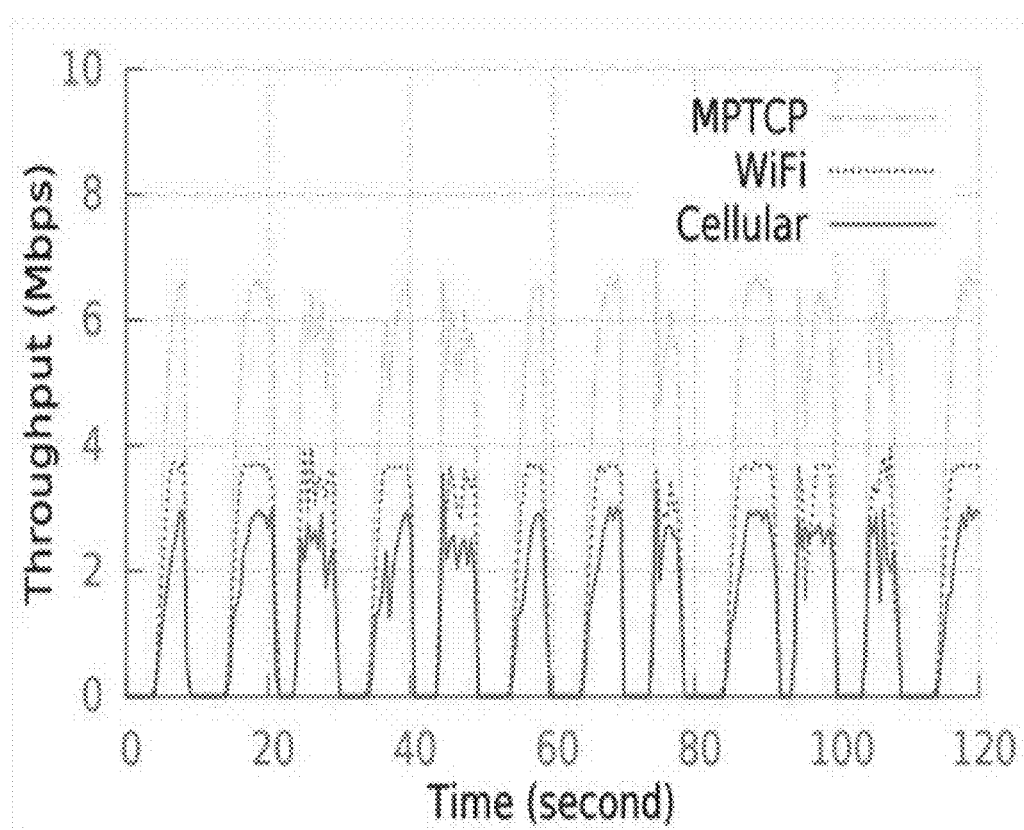
FIG. 4 illustrates an example throughput vs. time graph comprising MPTCP, Wi-Fi, and cellular network plots according to one or more embodiments.

Referring now to FIG. 4, illustrated is an example throughput vs. time graph comprising MPTCP, Wi-Fi, and cellular network plots according to one or more embodiments. Per FIG. 4, if a user wants to view a video, the video can support multiple encoding rates through adaptive bitrate streaming, wherein the highest encoding rate is close to 4 megabytes per second (Mbps). However, the bandwidth of the Wi-Fi network may be a bit lower than 4 Mbps at 3.8 Mbps. Therefore, FIG. 4 is predicated on a 0.2 Mbps gap, which needs to be filled using an LTE network. The LTE network can have 3.0 Mbps of throughput, which is more than enough need to fill the 0.2 Mbps gap. FIG. 4 plots the throughputs of Wi-Fi and LTE links and the overall throughput when playing the video over MPTCP in a steady state.

In FIG. 4, to download video chunks, the capacity of LTE link can be almost fully utilized. Since there can be a cost associated with using the LTE network, ideally the user would only want to use around 0.2 Mbps of the LTE link to fill the gap. However, the actual LTE data usage can be much higher than expected. The reason is that the default MPTCP scheduler, which prefers the path with a smaller round-trip-time (RTT), leverages only the latency information to schedule data packets and does not take into account that the LTE network may be more expensive than the Wi-Fi network. Therefore the deadline-aware scheduler can throttle the LTE network communication to fill the 0.2 Mbps gap.

Since video chunks are delay tolerant, after finishing downloading a chunk, the networks can be idle prior to fetching the next chunk. The idle time offers the opportunity to tweak the MPTCP scheduling to reduce cellular data usage. For example, the bandwidth of an LTE link can be throttled to be 0.3 Mbps, just slightly higher than what is needed. Consequently, the user can watch the video with the highest encoding rate and save cellular data usage on the LTE service.

Referring now to FIG. 5, illustrated is an example deadline-aware code according to one or more embodiments. The code can leverage the existing MPTCP schedulers to distribute packets over multiple paths and add the intelligence of how to control the cellular subflows. The code can have two input parameters, the file size S and the size of download time window D (from when download starts until the deadline). The while loop is responsible for sending data from the file using MPTCP (line 11). $R_{WiFi}$ in line 15 can be the current estimation of the Wi-Fi throughput. It could be a moving average of the throughput within a most recent time window. After sending out each packet, the code can verify if the Wi-Fi alone is sufficient to transmit the remaining data. If the Wi-Fi is sufficient, then the cellular subflow can be disabled when possible (lines 16-18). To compensate for estimation inaccuracy of Wi-Fi throughput, the target finish time can be ahead of a real deadline by setting α in lines 16 and 19 to be less than 1. The smaller the value of α is, the less likely the actual deadline will be missed. However, a smaller α can also lead to more data over cellular links. Since the Wi-Fi throughput can change over time, after the code disables the cellular link, it also needs to check if the cellular subflow should be enabled again, in case the Wi-Fi throughput drops (lines 19-21). Parameters β≥1 and γ≤1 can be used to avoid unnecessary oscillation between disabling and enabling the cellular link.

Performance of the proposed deadline-aware scheduler can depend on the estimation of Wi-Fi throughput. There are several methods that can improve the robustness of the proposed deadline-aware scheduling code and compensate for the inaccuracy of throughput estimation. A conservation margin can be added to the estimated capacity. For example, using only P % (P≤100) of the actual measured throughput as $R_{WiFi}$. Monitoring the throughput of cellular path $R_{cellular}$ can enable the cellular subflow without any conditions near the end of the deadline, at $$\alpha \times D - T_{ramp} - (S - \text{sentBytes})/(R_{WiFi} + R_{cellular}) \qquad \text{Eqn. 1}$$

where $T_{ramp}$ is the time needed for a cellular link and its TCP subflow to reach full capacity. Although these methods can avoid the missing of deadlines, they can increase cellular data usage and require additional work to select the proper parameters.

Figure 6:
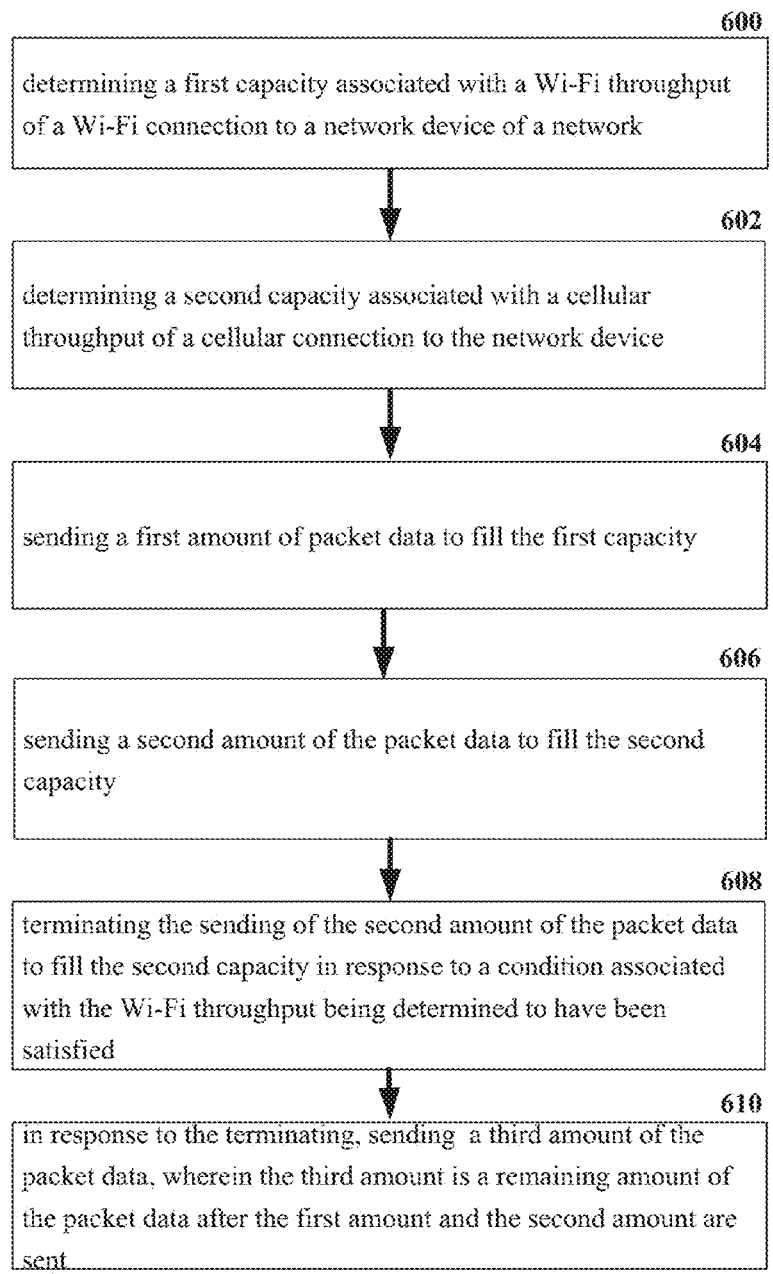
FIG. 6 illustrates an example schematic system block diagram for generating network efficiencies by leveraging an MPTCP scheduler according to one or more embodiments.

Referring now to FIG. 6, illustrated is an example schematic system block diagram for generating network efficiencies by leveraging an MPTCP scheduler according to one or more embodiments. At element 600, a first capacity associated with a Wi-Fi throughput of a Wi-Fi connection to a network device of a network can be determined by a system comprising a processor. At element 602, a second capacity associated with a cellular throughput of a cellular connection to the network device can be determined by the system. A first amount of packet data to fill the first capacity of the Wi-Fi throughput can be transmitted by the system at element 604. Consequently, a second amount of the packet data to fill the second capacity of the cellular throughput can be transmitted by the system at element 606. The deadline-aware MPTCP scheduler can drive both the cellular and Wi-Fi subflows to their full capacity. At element 608, the system can terminate the sending of the second amount of the packet data to fill the second capacity in response to a condition associated with the Wi-Fi throughput being determined to have been satisfied. For instance the deadline-aware scheduler can turn off the cellular subflow when the remaining data can be transmitted over Wi-Fi alone. In response to the terminating, the system can transmit up to a third amount of the packet data at element 610, wherein the third amount is a remaining amount of the packet data after the first amount and the second amount are sent. The deadline-aware scheduler can also monitor the progress of data transfer and turn cellular subflow back on if the Wi-Fi path underperforms.

Figure 7:
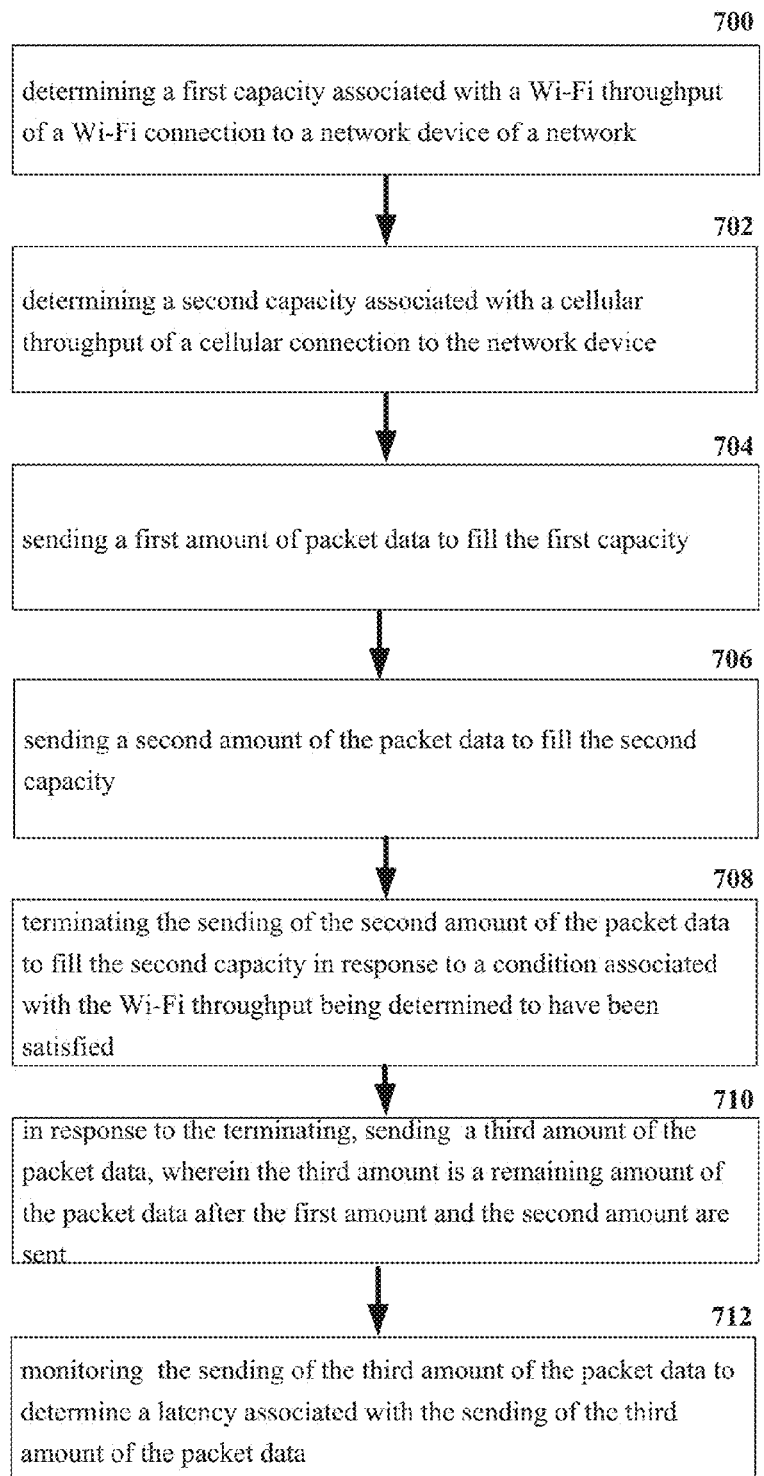
FIG. 7 illustrates an example schematic system block diagram for generating network efficiencies by leveraging an MPTCP scheduler and monitoring a Wi-Fi throughput according to one or more embodiments.

Referring now to FIG. 7, illustrated is an example schematic system block diagram for generating network efficiencies by leveraging an MPTCP scheduler and monitoring a Wi-Fi throughput according to one or more embodiments. At element 700, a first capacity associated with a Wi-Fi throughput of a Wi-Fi connection to a network device of a network can be determined by a system comprising a processor. At element 702, a second capacity associated with a cellular throughput of a cellular connection to the network device can be determined by the system. A first amount of packet data to fill the first capacity of the Wi-Fi throughput can be transmitted by the system at element 704. Consequently, a second amount of the packet data to fill the second capacity of the cellular throughput can be transmitted by the system at element 706. The deadline-aware MPTCP scheduler can drive both the cellular and Wi-Fi subflows to their full capacity. At element 708, the system can terminate the sending of the second amount of the packet data to fill the second capacity in response to a condition associated with the Wi-Fi throughput being determined to have been satisfied. For instance the deadline-aware scheduler can turn off the cellular subflow when the remaining data can be transmitted over Wi-Fi alone. In response to the terminating, the system can transmit up to a third amount of the packet data at element 710, wherein the third amount is a remaining amount of the packet data after the first amount and the second amount are sent. The deadline-aware scheduler can also monitor the progress of data transfer and turn cellular subflow back on if the Wi-Fi path underperforms. Consequently, at element 712, the transmitting up to the third amount of the packet data can be monitored to determine a latency associated with the transmitting up to the third amount of the packet data.

Figure 8:
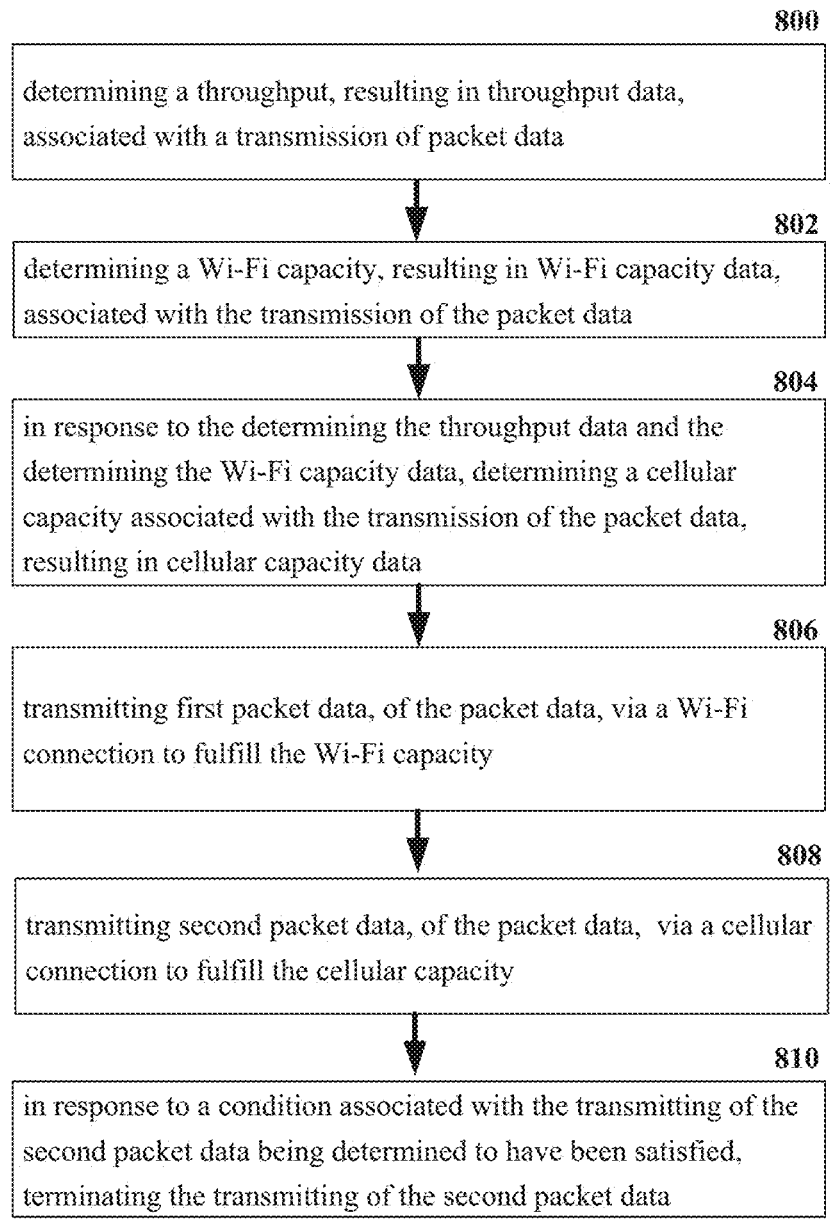
FIG. 8 illustrates an example schematic system block diagram for generating network efficiencies by leveraging an MPTCP scheduler, wherein the MPTCP scheduler can terminate a cellular connection in response to a condition being satisfied.

Referring now to FIG. 8, illustrated is an example schematic system block diagram for generating network efficiencies by leveraging an MPTCP scheduler, wherein the MPTCP scheduler can terminate a cellular connection in response to a condition being satisfied. At element 800, a throughput can be determined, resulting in throughput data, associated with a transmission of packet data; and at element 802, a Wi-Fi capacity can be determined, resulting in Wi-Fi capacity data, associated with the transmission of the packet data via a Wi-Fi connection. In response to the determining of the throughput data and the determining of the Wi-Fi capacity data, a cellular capacity associated with the transmission of the packet data via a cellular connection can be determined at element 804, resulting in cellular capacity data. At element 806, first packet data, of the packet data, can be transmitted via the Wi-Fi connection, to fulfill the Wi-Fi capacity. At element 808, second packet data, of the packet data, can be transmitted via the cellular connection to fulfill the cellular capacity. Thus, the deadline-aware MPTCP scheduler can drive both the cellular and Wi-Fi subflows to their full capacity. In response to a condition associated with the transmitting of the second packet data being determined to have been satisfied, the transmitting of the second packet data can be terminated at element 810. Consequently, the deadline-aware MPTCP scheduler can turn off the cellular subflow when the remaining data can be transmitted over Wi-Fi alone.

Figure 9:
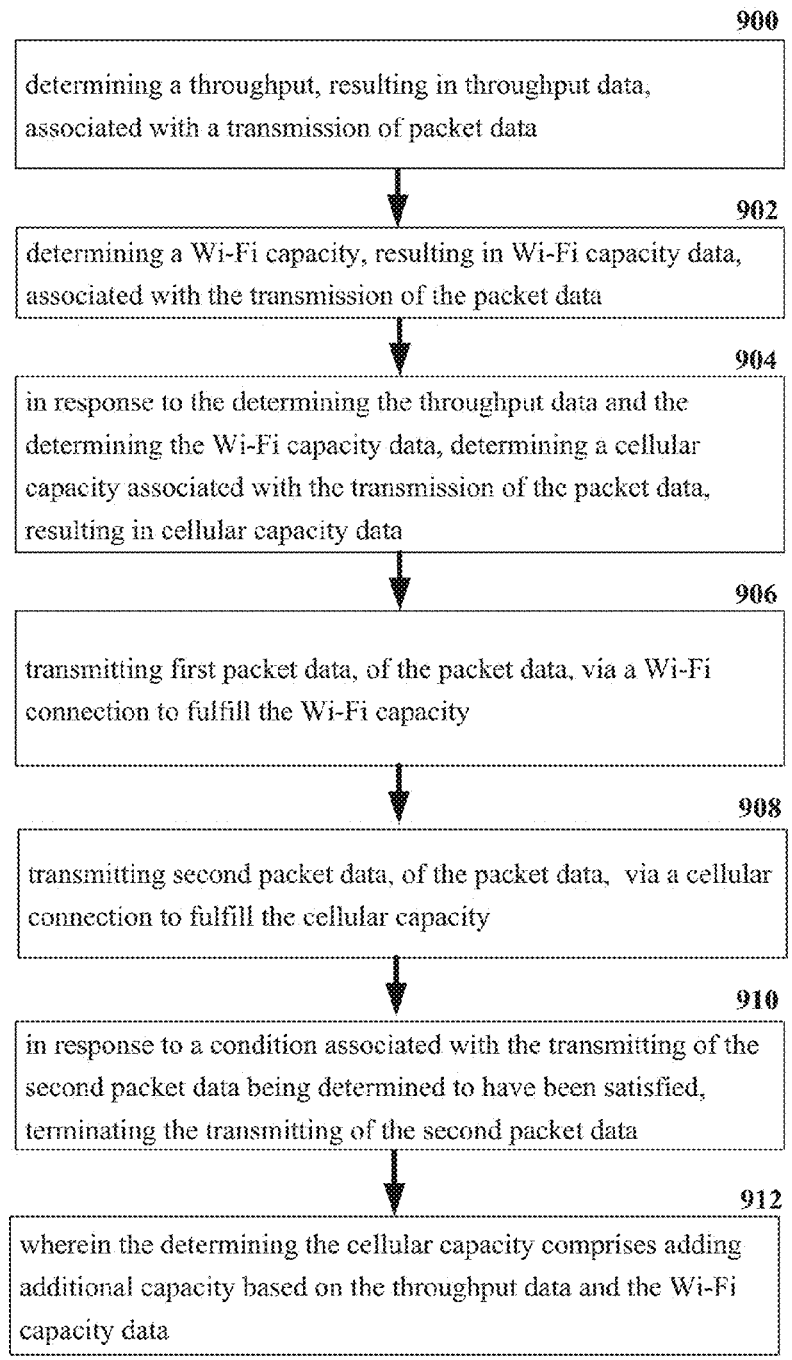
FIG. 9 illustrates an example schematic system block diagram for generating network efficiencies by leveraging an MPTCP scheduler, wherein the MPTCP scheduler can terminate a cellular connection in response to a condition being satisfied and add additional capacity to the network.

Referring now to FIG. 9, illustrated is an example schematic system block diagram for generating network efficiencies by leveraging an MPTCP scheduler, wherein the MPTCP scheduler can terminate a cellular connection in response to a condition being satisfied and add additional capacity to the network. At element 900, a throughput can be determined, resulting in throughput data, associated with a transmission of packet data; and at element 902, a Wi-Fi capacity can be determined, resulting in Wi-Fi capacity data, associated with the transmission of the packet data via a Wi-Fi connection. In response to the determining of the throughput data and the determining of the Wi-Fi capacity data, a cellular capacity associated with the transmission of the packet data via a cellular connection can be determined at element 904, resulting in cellular capacity data. At element 906, first packet data, of the packet data, can be transmitted via the Wi-Fi connection, to fulfill the Wi-Fi capacity. At element 908, second packet data, of the packet data, can be transmitted via the cellular connection to fulfill the cellular capacity. Thus, the deadline-aware MPTCP scheduler can drive both the cellular and Wi-Fi subflows to their full capacity. In response to a condition associated with the transmitting of the second packet data being determined to have been satisfied, the transmitting of the second packet data can be terminated at element 910. Consequently, the deadline-aware MPTCP scheduler can turn off the cellular subflow when the remaining data can be transmitted over Wi-Fi alone. At element 912, the determining the cellular capacity can comprise adding additional capacity based on the throughput data and the Wi-Fi capacity data.

Figure 10:
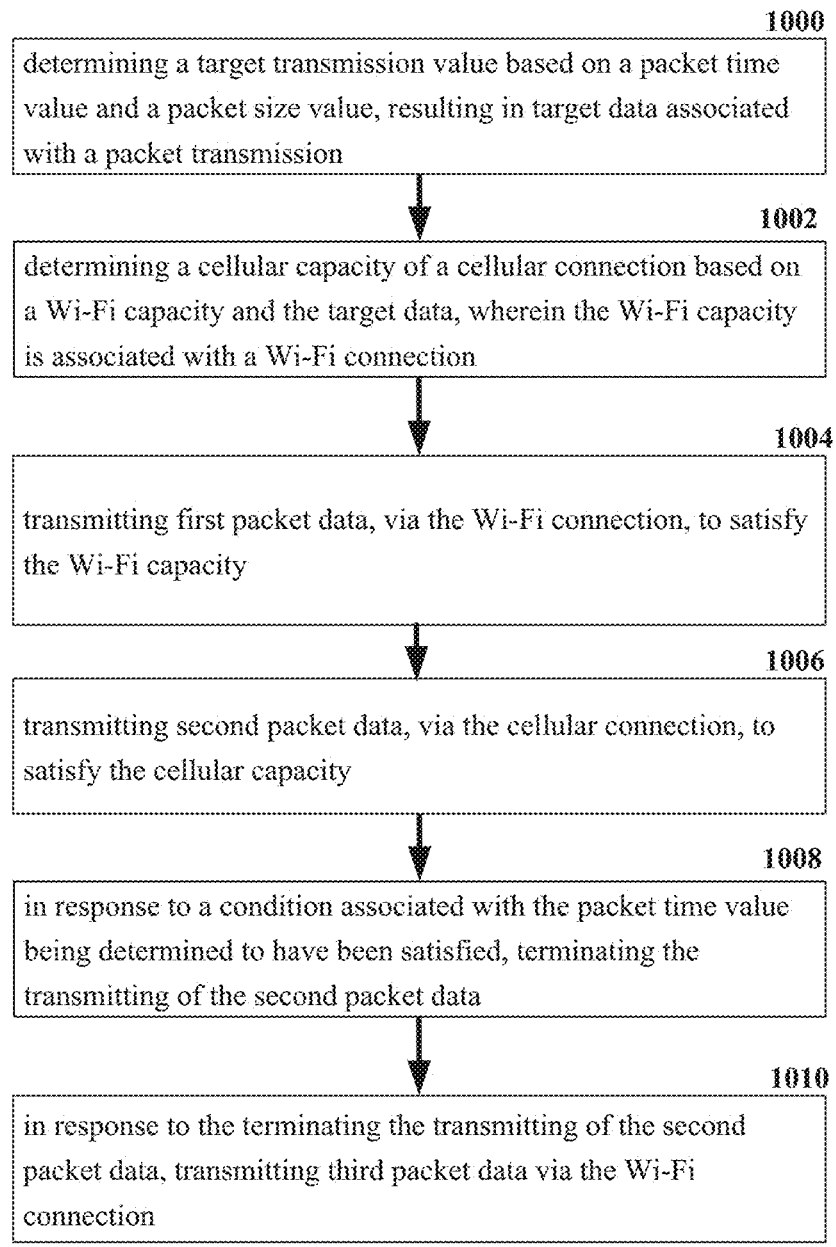
FIG. 10 illustrates an example schematic system block diagram for generating network efficiencies by leveraging an MPTCP scheduler, wherein the MPTCP scheduler can terminate a cellular connection in response to a condition being satisfied and send additional data in response to another condition being satisfied.

Referring now to FIG. 10, illustrated is an example schematic system block diagram for generating network efficiencies by leveraging an MPTCP scheduler, wherein the MPTCP scheduler can terminate a cellular connection in response to a condition being satisfied and send additional data in response to another condition being satisfied. At element 1000, a target transmission value can be determined based on a packet time value and a packet size value, resulting in target data associated with a packet transmission. At element 1002, a cellular capacity of a cellular connection can be determined based on a Wi-Fi capacity and the target data, wherein the Wi-Fi capacity is associated with a Wi-Fi connection, and wherein the target cellular capacity can be less than an actual cellular capacity. First packet data can be transmitted via the Wi-Fi connection to satisfy the Wi-Fi capacity at element 1004, and second packet data can be transmitted via the cellular connection to satisfy the cellular capacity at element 1006. Thus, the deadline-aware MPTCP scheduler can drive both the cellular and Wi-Fi subflows to their full capacity. In response to a condition associated with the packet time value being determined to have been satisfied, the transmitting of the second packet data can be terminate at element 1008. Consequently, the deadline-aware MPTCP scheduler can turn off the cellular subflow when the remaining data can be transmitted over Wi-Fi alone. At element 1010, in response to the terminating the transmitting of the second packet data, third packet data can be transmitted via the Wi-Fi connection.

Figure 11:
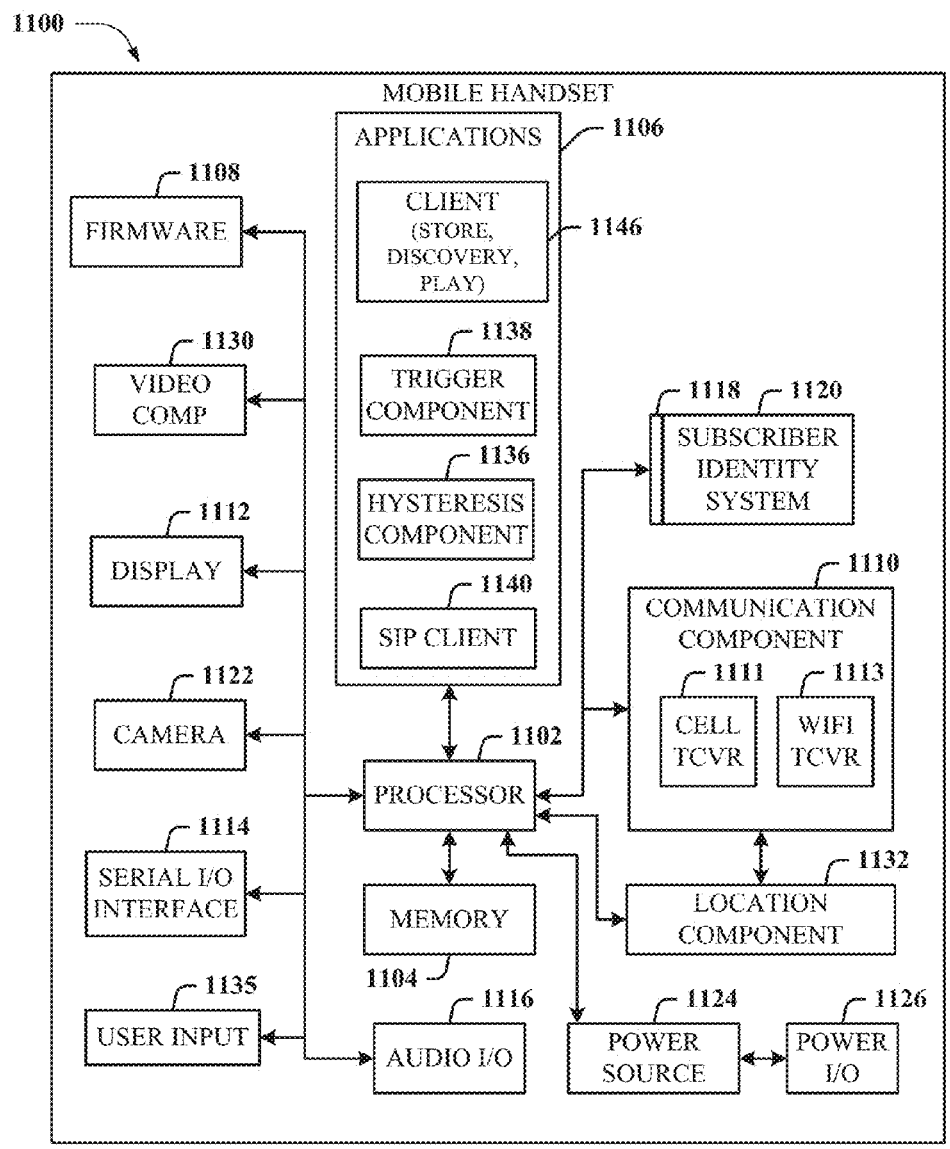
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications of this disclosure, can comprise an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
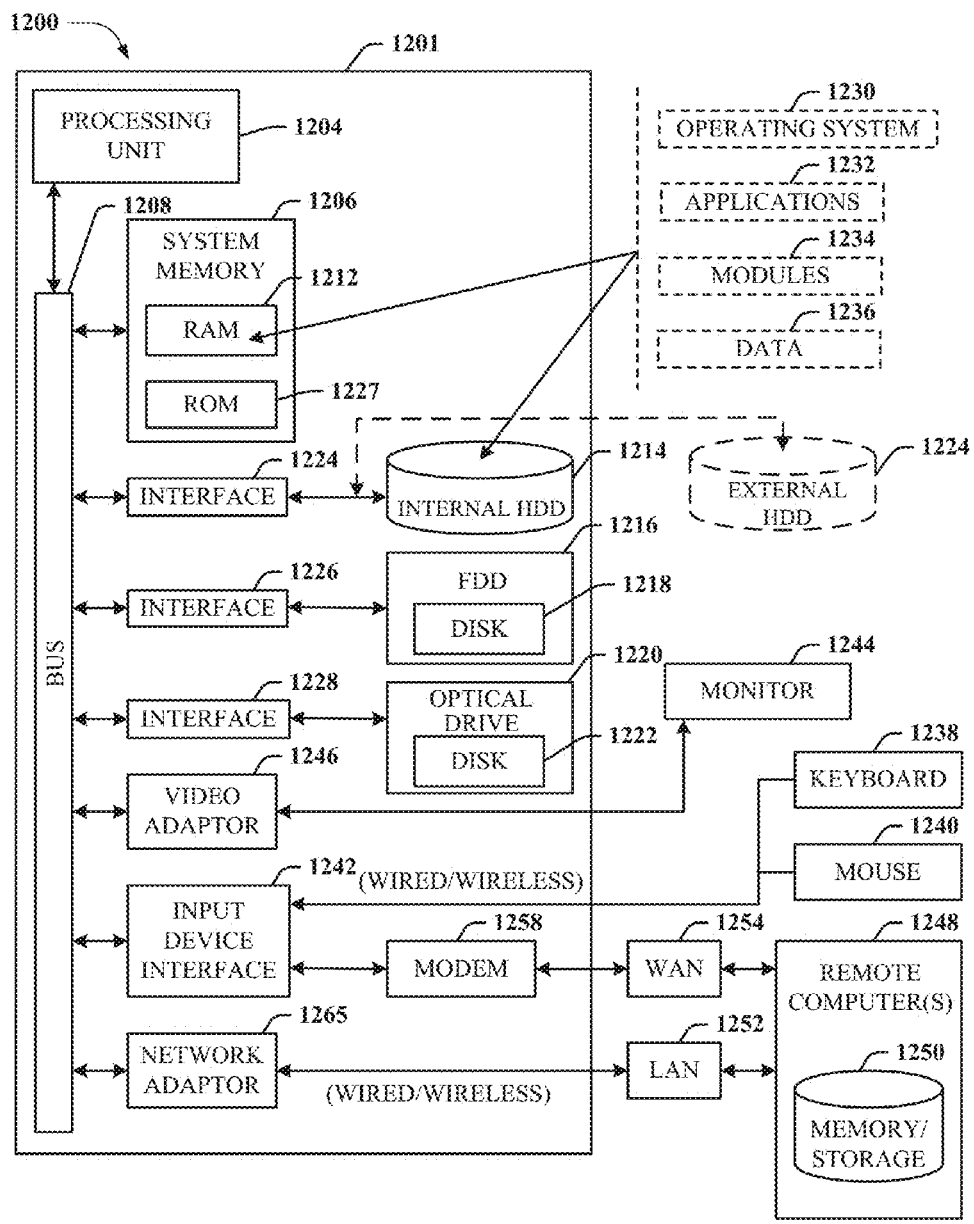
FIG. 12 illustrates an example block diagram of an example computer operable to engage in a system architecture that facilitates secure wireless communication according to one or more embodiments described herein.

Referring now to FIG. 12, illustrated is a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, a first capacity associated with a Wi-Fi throughput of a Wi-Fi connection to a network device of a network;
   determining, by the system, a second capacity associated with a cellular throughput of a cellular connection to the network device;
   transmitting, by the system, a first amount of packet data to fill the first capacity of the Wi-Fi throughput;
   transmitting, by the system, a second amount of the packet data to fill the second capacity of the cellular throughput;
   terminating, by the system, the transmitting of the second amount of the packet data to fill the second capacity in response to a condition associated with the Wi-Fi throughput being determined to have been satisfied; and
   in response to the terminating, transmitting, by the system, up to a third amount of the packet data, wherein the third amount is a remaining amount of the packet data after the first amount and the second amount are sent.

2. The method of claim 1, further comprising:
   monitoring, by the system, the transmitting up to the third amount of the packet data to determine a latency associated with the transmitting up to the third amount of the packet data.

3. The method of claim 2, wherein the condition is a first condition, and further comprising:
   in response to a second condition associated with the latency being determined to have been satisfied, initiating, by the system, transmitting up to the third amount of the packet data via the cellular connection.

4. The method of claim 3, wherein the latency comprises an indication of a time delay associated with the transmitting up to the third amount of data.

5. The method of claim 1, wherein the determining the first capacity is in response to determining an estimated throughput value associated with a throughput of the Wi-Fi connection to the network device.

6. The method of claim 5, wherein the determining the second capacity is in response to determining the estimated throughput value, and wherein the estimated throughput value comprises file size data associated with a file to be received by the network device.

7. The method of claim 5, wherein the estimated throughput value comprises time data associated with a size of a download to be received by the network device.

8. The method of claim 1, wherein the condition comprises receiving an indication that the second capacity of the cellular throughput is full.

9. A system, comprising:
   a processor; and
   a memory that stores executable instructions that, when executed by the processor, facilitate performance of operations, comprising:
      determining a throughput, resulting in throughput data, associated with a transmission of packet data;
      determining a Wi-Fi capacity, resulting in Wi-Fi capacity data, associated with the transmission of the packet data via a Wi-Fi connection;
      in response to the determining the throughput and the determining the Wi-Fi capacity, determining a cellular capacity associated with the transmission of the packet data via a cellular connection, resulting in cellular capacity data;
      transmitting first packet data, of the packet data, via the Wi-Fi connection to fulfill the Wi-Fi capacity,
      transmitting second packet data, of the packet data, via the cellular connection to fulfill the cellular capacity; and
      in response to a condition associated with the transmitting of the second packet data being determined to have been satisfied, terminating the transmitting of the second packet data.

10. The system of claim 9, wherein the determining the cellular capacity comprises adding additional capacity based on the throughput data and the Wi-Fi capacity data.

11. The system of claim 10, wherein the operations further comprise:
    in response to the terminating the transmitting the second packet data, transmitting third packet data, of the packet data, via the Wi-Fi connection.

12. The system of claim 11, wherein the third packet data is remaining packet data, of the packet data, and wherein the transmitting the third packet data comprises transmitting the third packet data after the first packet data and the second packet data have been transmitted.

13. The system of claim 12, wherein the operations further comprise:
    monitoring the Wi-Fi connection for a latency associated with the transmitting of the third packet data.

14. The system of claim 13, wherein the condition is a first condition, and wherein the operations further comprise:
    in response to a second condition associated with the latency being determined to have been satisfied, offloading a portion of the third packet data to be transmitted via the cellular connection.

15. A non-transitory machine-readable medium, comprising executable instructions that, when executed by a processor, facilitate performance of operations, comprising:
    determining a target transmission value based on a packet time value and a packet size value, resulting in target data associated with a packet transmission;
    determining a target cellular capacity of a cellular connection based on a Wi-Fi capacity and the target data, wherein the Wi-Fi capacity is associated with a throughput of a Wi-Fi connection, and wherein the target cellular capacity can be less than an actual cellular capacity;
    transmitting first packet data, via the Wi-Fi connection, to satisfy the Wi-Fi capacity;
    transmitting second packet data, via the cellular connection, to satisfy the cellular capacity;
    in response to a condition associated with the packet time value being determined to have been satisfied, terminating the transmitting of the second packet data; and
    in response to the terminating the transmitting the second packet data, transmitting third packet data via the Wi-Fi connection.

16. The non-transitory machine-readable medium of claim 15, wherein the condition comprises an indication that the transmitting of the third packet data via the Wi-Fi connection does not exceed the target transmission value.

17. The non-transitory machine-readable medium of claim 16, wherein the operations further comprise:
  transmitting the third packet data via the Wi-Fi connection.

18. The non-transitory machine-readable medium of claim 17, wherein the third packet data is remaining packet data after the first packet data and the second packet data are transmitted.

19. The non-transitory machine-readable medium of claim 18, wherein the operations further comprise:
  analyzing the transmitting the third packet data for a latency via the Wi-Fi network.

20. The non-transitory machine-readable medium of claim 19, wherein the operations further comprise:
  in response to determining the latency, transmitting the third packet data via the cellular connection.

* * * * *